United States Patent [19]
Lochhead et al.

[11] Patent Number: 5,905,127
[45] Date of Patent: May 18, 1999

[54] POLYMERIZABLE MESOPHASES BASED ON SUBSTITUTED UNSATURATED CARBOXYLIC ACIDS

[75] Inventors: Robert Y Lochhead; Lon J Mathias, both of Hattiesburg, Miss.

[73] Assignee: The University of Southern Mississippi, Hattiesburg, Miss.

[21] Appl. No.: 08/825,797

[22] Filed: Apr. 8, 1997

Related U.S. Application Data

[60] Provisional application No. 60/014,925, Apr. 8, 1996, and provisional application No. 60/014,926, Apr. 8, 1996.

[51] Int. Cl.$^6$ .......................... C07C 57/02; C07C 57/18; C08F 12/20; C08F 14/18

[52] U.S. Cl. .......................... 526/242; 562/426; 562/430; 562/442; 562/443; 562/449; 562/450; 562/456; 562/495; 562/507; 562/510; 562/555; 562/556; 562/574; 562/583; 562/595; 562/596; 562/602; 562/605; 562/579; 562/582; 562/586; 526/242; 526/243; 526/245; 526/246; 526/247; 526/248; 526/277; 526/278; 526/279; 526/286; 526/287; 526/288; 526/289; 526/291; 526/292.1; 526/292.2; 526/292.3; 526/292.95; 526/293; 526/294; 526/295; 526/301; 526/304; 526/308; 526/309; 526/314; 526/318; 526/318.3; 526/312; 556/437; 560/146; 560/193; 560/195; 560/196; 560/197; 560/201; 560/205

[58] Field of Search ...................................... 562/583, 595, 562/596, 602, 605, 426, 430, 442, 443, 449, 450, 456, 495, 507, 510, 555, 556, 579, 582, 586, 574, 594, 598; 526/242, 243, 245, 246, 247, 248, 277, 278, 279, 286, 287, 288, 289, 291, 292.1, 292.2, 292.3, 292.95, 293, 294, 295, 301, 304, 308, 309, 312, 314, 318, 318.3; 560/146, 193, 195, 196, 197, 201, 205; 556/437

[56] References Cited

U.S. PATENT DOCUMENTS 5,171,765  12/1992  Jones et al. .............................. 523/415

FOREIGN PATENT DOCUMENTS

97/006000  1/1997  WIPO .

OTHER PUBLICATIONS

"Syntheses, Polymerization and Characterization of Novel Semifluorinated Methacrylates", Jariwala et al, Macromolecules 5129, pp. 5129–5136, 1993.

"New Hydrophobic and Liquid–Crystalline Fluoroalkyl Ether Derivatives", Jariwala et al, Macromolecules 6352, pp. 6352–6353, 1991.

"Polymerized Lyotrophic Liquid Crystals as Contact Lens Materials", Anderson et al, A176 PHYSICA 151, 1991.

Chemical Abstracts 100:34206, "Nitroarylation of Alkenes by Aryldiazonium Salts in the Presence of Sodium Nitrate", Apr. 1983.

Printout and Structure Diagram for Registry No. 88382–52–9, Apr. 1998.

*Primary Examiner*—Frederick Krass
*Attorney, Agent, or Firm*—Arnold, White & Durkee

[57] ABSTRACT

Mesogens are provided based on substituted unsaturated carboxylic acids such as acrylic and methacrylic acid. Substitution of a variety of hydrophobic tails onto the carboxylic acid or acid derivative via the vinyl carbon proximal to the carbonyl of the carboxylic acid results in mesogens that are capable of forming thermotropic and single-phase lyotropic mesophases over a broad range of compositions. The mesophases can be polymerized to lock in the ordered phases.

16 Claims, No Drawings

POLYMERIZABLE MESOPHASES BASED ON SUBSTITUTED UNSATURATED CARBOXYLIC ACIDS

This application claims priority to U.S. Provisional Patent Applications 60/014,925 filed on Apr. 8, 1996 and 60/014,926 filed Apr. 8, 1996.

BACKGROUND OF THE INVENTION

The present invention relates to mesomorphic structures. More particularly, the present invention relates to mesophases based on polymerizable substituted carboxylic acids, for example substituted acrylic and methacrylic acids and their derivatives.

Liquid crystals, rather than being true liquids or true solids, occupy a state of matter somewhere between these two phases. True liquids are isotropic in that their molecules lack the ordered arrangement necessary to be a solid. In solids, the position of molecules is fixed in an ordered crystalline lattice or array. Like true liquids, liquid crystals exist in a liquid state. However, unlike true liquids but like solids, liquid crystals are characterized by the fact that their molecules are aligned in an ordered crystalline array. For this reason, liquid crystals are characterized as being anisotropic. The ordered regions in the liquids are referred to as mesophases while the individual molecular combinations that result in the mesophases are referred to as mesogens.

The type of molecules or mesogens that show a propensity for forming mesophases are typically characterized by an elongated or disk-like structure. Polarizability of the mesogen impacts the propensity for two molecules to be attracted to each other and thus assume an ordered state. One class of mesogen will therefore typically have a polar terminal group. A non-polar, often an alkyl or substituted alkyl, tail is typically provided at the other end of the mesogen. Thus, this class of mesogens will typically have a polar, hydrophilic group disposed at one end and a non-polar, hydrophobic tail disposed at the other end. However, mesogens are known which possess a central non-polar core and two polar ends or indeed vice versa.

Mesophases may form upon heating of the pure compound in which case they are referred to as being thermotropic. Alternatively, mesophases may form when the pure compound is placed in the presence of certain solvents in which case they are referred to as being lyotropic. The mesophases may be further classified according to the structure or orientation the individual molecules assume in the mesophase. In a smectic orientation, the mesogens are arranged in layers with respect to their centers of gravity. Moreover, the long axis of the mesogens are arranged in one preferred direction of alignment. In smectic systems, the lateral interactions between the mesogens are favored over the interactions between the layers. Thus, the smectic arrangement results in a characteristic fluidity evidenced by the slippage of one layer over another without the destruction of the order within each layer. In nematic systems, the long axes of the mesogens remain in a single preferred direction of alignment. However, the mesophase is no longer characterized by distinct layers of mesogens. In cholesteric systems, the mesophase is characterized by a helical structure. The helical structure is the result of a chiral center in the mesogen that causes the long axes of the mesogens to be rotated for successive layers.

The benefits of such an ordered system in a polymer matrix can be substantial. By polymerizing the liquid crystal system the ordered arrangement is frozen into place. Upon extrusion or processing, the rigid polymeric mesophases become aligned in the direction of flow, reducing frictional drag and viscosity. Upon cooling, the ordered arrangement is also maintained. The resulting polymer can exhibit greatly improved mechanical properties, including tensile strength and impact strength. The mechanical properties can also be tailored to confer anisotropic properties on the material. For example, the polymeric material could be prepared to resist shear in one direction, but to easily shear in the plane defined by the other two directions.

Polymerizable carboxylic acids, in particular acrylic and methacrylic acid, would upon initial observation appear ill-suited for the formation of mesophases. While exhibiting a polarizable acid group, these acids are not exemplematic of the elongated, disk-like molecules typically thought of as mesogens.

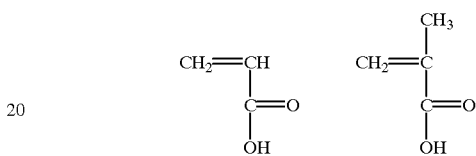

Typical derivatives of these carboxylic acid monomers, would also appear to be ill-suited to the formation of mesophases. These derivatives would include polymerizable salts of the acids such as sodium methacrylate; methyl and other alkyl derivatives of the acids such as poly(methyl acrylate) and poly(methyl methacrylate); and polymethacrylonitrile.

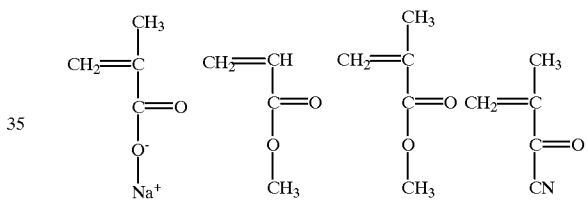

Some of these polymeric derivatives, namely the salts, the nitrile, and the shorter chain alkyl species, lack the elongated structure necessary for mesomorphic characteristics. Moreover, longer chain alkyl or similar derivatives, while having an elongated structure, are no longer characterized by one hydrophilic end and a second hydrophobic end. Thus, longer chain alkyl derivatives—esters—such as n-octyl methacrylate normally do not form single-phase lyotropic mesophases over a broad useful range of compositions.

Poly(acrylic acid) and poly(methacrylic acid) also do not exhibit the typical properties of liquid crystalline polymers. They are readily soluble in water and dilute bases. Their sensitivity to water renders the polymers impractical for most plastic applications. Likewise, rather than exhibiting excellent mechanical properties, poly(acrylic acid) and poly(methacrylic acid) are relatively brittle when in the dry solid state. Rather than melting and becoming thermoplastic upon heating, they crosslink, char, and degrade. Finally, in solution, they exhibit unusually high viscosities and for this reason are commonly used as thickening agents. They by no means possess the qualities of a lubricant.

Despite these problems, a polymeric derivative of these unsaturated carboxylic acids that exhibited mesomorphic properties would be extremely beneficial in certain applications.

SUMMARY OF THE INVENTION

In accordance with one aspect of the invention, there is provided a mesogen of the structure

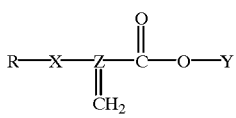
(I)

while in accordance with another aspect of the invention there is provided a mesogen of the structure

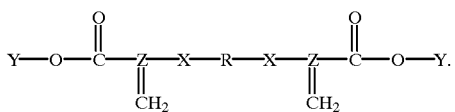
(II)

For both of these mesogens, formulas (I) and (II), R comprises linear or branched alkyl, alkenyl, fluoroalkyl, chloroalkyl, aryl, alkylaryl, cycloalkyl, polysiloxyl, silicones, or combinations thereof, X, a linking group, comprises

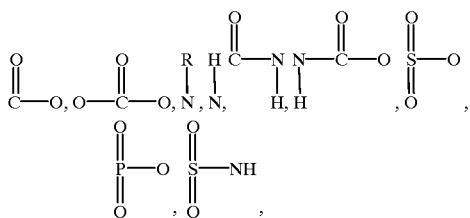

—O—, —S—, or —N$^+$(R$^S$)$_2$—; Z which is indicative of the specific acid employed comprises —C—, —CH$_2$—C—, —C—[C(R′)$_2$]$_n$—, or —CH$_2$—C—[C(R′)$_2$]$_n$—; and Y comprises H, a metal ion, ammonium or alkylammonium ion, quaternary ammonium ion, or phosphonium ion. In both instances, each R$^S$ independently comprises hydrogen; linear or branched alkyl, alkenyl, fluoroalkyl, chloroalkyl, aryl, alkylaryl, cycloalkyl, or polysiloxyl groups; or combinations thereof. In both instances, each R$^t$ group may independently be hydrogen, which is preferable, but may also be a lower alkyl such as methyl, and "n" is a number ranging from two to five. Independently comprises means that multiple occurrences of a functionality may be the same or different. For the mesogen of formula (II), the various occurrences of functionalities Y, Z, X may likewise be the same or different.

In accordance with still another aspect of the invention, there is provided mesophases comprised of ordered arrangements of mesogens of formulas (I) or (II). The mesophase may contain mesogens that are not all identical and indeed that are not all indicative of formulas (I) and (II).

In accordance with still another aspect of the invention, there is provided a composition comprised of polymerized monomers of formulas (I) or (II). Because the mesogens of formulas (I) or (II) contain a polymerizable double bond, the mesogens can be thought of as monomers. The composition may be homogeneous but may alternatively contain monomers that are not all identical and indeed that are not all indicative of formulas (I) and (II). When monomers of more than one type comprise the polymeric composition, the composition may exhibit a block or random arrangement of the various monomers.

DESCRIPTION OF ILLUSTRATIVE EMBODIMENTS

While the invention is susceptible to various modifications and alternative forms, specific embodiments have been shown by way of examples and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

In accordance with the present invention, a family of multifunctional unsaturated carboxylic acid monomers are provided that allow for the generation of novel mesomorphic materials. These monomers can be polymerized to lock in the ordered phases. Upon polymerization, the ordered phases are maintained to confer anisotropic flow properties which are useful in applications such as lubrication, and multimembrane properties which are useful for example in bioadhesion and controlled release applications.

In accordance with one embodiment of the invention, mesogenic monomers are provided. The key molecular properties for these monomers are a hydrophobic tail attached to the unsaturated carboxylic acid, a free carboxylic acid or carboxylic acid salt with high polarity and the ability to associate strongly with water. The hydrophobic tail, which may comprise alkyl, substituted alkyl, or other substituents, provides the elongated structure necessary for a mesogen. However, the hydrophobic tail is attached to the carboxylic acid core in a manner that does not destroy the polar nature of the carboxylic acid moiety. The acids are ionizable groups, and because the representative carboxylic acids are relatively weak, they can be selectively titrated with base to give a mixture of neutralized and unneutralized species intermolecularly mixed within the liquid crystal. This allows for easier manipulation of the mesophase so as to facilitate the preparation of the exact desired structure. Other polar groups would not give the large variation in structure—effective head group size—with such ease. Thus, the compositional range of the mesophases is more restricted with these other polar groups. In the case of lamellar structure, the free acid group provides ionic repulsion between the layers. This confers a larger compositional region of single-phase lamellar structure. In the absence of this ionic repulsion, the single phase lamellar region would be more restricted in compositional range by encroachment of two-phase and three-phase coexisting regions.

Typical structures for the monomers of this embodiment are given below with the understanding that extension of these basic units to include a wide variety of additional functional groups is inherent in this disclosure.

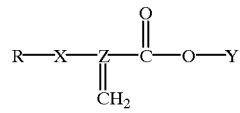

wherein

R=linear or branched alkyl, alkenyl, fluoroalkyl, chloroalkyl, aryl, alkylaryl, cycloalkyl, polysiloxyl, silicones, or combinations thereof;

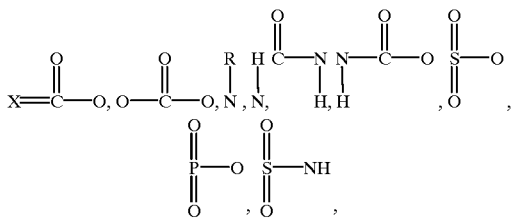

—O—, —S—, or —N⁺(R$^s$)$_2$—;
Z=—C—, —CH$_2$—C—, —C—[C(R$^r$)$_2$]$_n$—, or —CH$_2$—C—[C(R$^r$)$_2$]$_n$—;
and Y=H, a metal ion, ammonium or alkylammonium ion, quaternary ammonium ion, or phosphonium ion, wherein each R$^S$ group independently comprises hydrogen; linear or branched alkyl, alkenyl, fluoroalkyl, chloroalkyl, aryl, alkylaryl, cycloalkyl, or polysiloxyl groups; and combinations thereof, wherein R$^r$ is preferably hydrogen but may be a lower alkyl such as methyl, ethyl, or propyl with methyl being preferred, and wherein n is a number ranging from two to five.

These materials, either neat or in the presence of polar solvents such as water, spontaneously form lyotropic mesophases comprising an ordered organization of the hydrophilic-hydrophobic components.

The length of hydrophobic tail R is important for two reasons. The terminal R group must be of sufficient length to provide a non-polar balance to the polar carboxylic acid group at the other end of the mesogen. It must likewise be of sufficient length to provide the necessary elongation for mesomorphic characteristics. Thus, to meet both requirements, the R group should contain at a minimum six carbon atoms. The R group may be branched, unsaturated, contain an aryl, cycloalkyl, or other indicated functionality. Hydrogens disposed along the hydrophobic tail may be substituted with halogens, preferably fluorine or chlorine substitution, and more preferably fluorine substitution. The level of fluorine substitution—or other halogen substitution—on the chain may vary from a single —CF$_3$ (or —CF$_2$ as appropriate) moiety to complete substitution, for example a perfluoroalkyl group. The hydrophobic tail may likewise contain alkyl ether or halogenated ether portions. Examples of such groups are poly(oxypropylene), poly(oxybutylene), their fluoro-substituted derivatives and homologues thereof.

If the R group is comprised of an alkenyl functionality or other unsaturated group it may be in a sufficiently protected environment so as to not participate in polymerization. The primary requirement for the hydrophobic R group is that the compound—mesogen—will associate into mesophases.

For certain applications, it may, as indicated, be desirable to substitute some or all of the hydrogens attached to the carbons of the R group, for example, with fluorides. The fluorides provide lower surface energy to the hydrophobic tail than the hydrogen saturated alternative. They also provide increased stability to the mesogen in that the fluoride substitution increases oxidation resistance, hydrolysis resistance, and oxygen transport that may alternatively or in combination be necessary for certain applications. The fluoride substitution also enhances lubrication between adjacent mesogen layers.

Improvements similar to those provided by fluoride substitution can be provided by the incorporation of silicone in the hydrophobic tail group R. Generally and for the purposes of this invention silicone is a structure comprising moieties of the type [—Si(R$^a$)$_x$(R$^b$)$_y$O$_{\{[4-(x+y)]/2\}}$—] where $0 \leq x \leq 2$, $0 \leq y \leq 2$, and $x+y \leq 2$. R$^a$ and R$^b$ may be alkyl, aryl, alkylaryl, cycloalkyl, or combinations thereof and may be the same or different. Among the results of this substitution would be even greater oxygen transport. It is anticipated that other substituents on the hydrophobic R chain would be acceptable as long as the hydrophobic nature of the chain is not sufficiently destroyed.

The X group acts as a linking group between the non-polar, hydrophobic R group and the polar carboxylic acid core. Among the purposes for its inclusion, the primary reason is to provide a means for balancing the polarity of the hydrophilic portion of the mesogen and to provide the correct molecular shape to allow packing of the molecules into the desired mesophase. The use of unsaturated X groups can in certain applications be utilized as a means to achieve controlled crosslinking.

A precise formula or set of criteria does not exist for determining what X linking group will be appropriate for a specific intended application or more appropriately what X linking group will be appropriate for any particular combination of R, Z, and Y groups. Indeed, for certain applications and certain combinations of R, Z, and Y, no X group may be needed. All such determinations can be made only as the result of routine experimentation and the use of phase diagrams, or combinations of these. However, the determination of the appropriate X group or lack thereof in certain instances is within the capabilities of one of ordinary skill in the art having the aid of this disclosure.

From the previously indicated structure, it is apparent that the different structures that can variably constitute the Z group are quite diverse ranging preferably from a single carbon species to a six carbon primary chain species. While relatively long unsaturated carboxylic acids are known, including those exceeding twenty carbon atoms such as erucic acid, these acids are not easily polymerized within liquid crystalline phases. This and other reasons render impractical the use of the known long chain carboxylic acids. Further, if the length of the Z group is exceedingly long or too highly branched, packing of the mesogens into liquid crystal structures will be impaired. Also, the positioning of substitution of the hydrophobic tail and linking group onto the acid or acid derivative can be more precisely controlled with shorter acid groups. Therefore, in this embodiment, Z is limited to species having at most a six carbon primary chain. Thus as previously indicated "n" will preferably be a number ranging from two to five. Because of the detrimental effects that extensive branching would cause, it is preferred that the carbon chain representing Z be fully hydrogenated. Substitution of lower alkyls is allowed as long as it does not impair the formation of a mesophase. So limited, these compounds readily polymerize when initiated within the mesophase structure. For the forgoing reasons, mesogens based on acrylic acid in which Z is a single carbon species and mesogens based on methacrylic acid in which Z is a two carbon species with the vinyl carbon proximal to the carbonyl also being the alpha carbon are preferred. In polymeric applications in which the ordered layers of adjacent mesogens are locked into place, the use of mesogens based on methacrylic acid are particularly preferred.

Although hydrogen, metal ions, ammonium, and phosphonium are provided as examples of the Y terminal group, it should be understood that the range of acceptable Y groups is not limited to this list. The only requirements for Y are that the group or atom used should not defeat the polarity provided by the carboxylic acid moiety or the ability to initiate polymerization at the vinyl bond. Additionally, the choice for Y should not have a significant detrimental effect on the solubility of the mesogen. Thus, when metal ions are employed as Y, they are preferably alkali and alkaline earth metals,.

The exact non-polar, hydrophobic (R) and polar hydrophilic (X and Y) substituents, and the relative concentrations, are preferably chosen so that the mesogens arrange themselves in the pure state or in the presence of certain polar solvents into thermodynamically stable liquid crystalline phases—mesophases. One particular phase is the lamellar liquid crystalline phase characterized by lamellae consisting of alternating hydrophilic and hydrophobic portions.

Other liquid crystalline phases may be present either alone or in combination with the lamellar phase. These include hexagonal and cubic liquid crystalline phases. These phases can be expected to border compositions exhibiting lamellar phases. Additionally, hexagonal and reversed hexagonal liquid crystalline phases can be expected to occur at lower and higher concentrations, respectively, than the lamellar phase. In the unpolymerized state, the lamellar phase displays a lubricant rheology, the hexagonal phases are gels with uniaxial flow properties, and the cubic phases are plastic gels.

In another embodiment, the typical mesogenic structure characterized by a polar, hydrophilic head group and hydrophobic tail can be replaced by a mesogen having two polar, hydrophilic polar groups connected by and separated by central hydrophobic segment. For this embodiment, the mesogen can be characterized by the following structure.

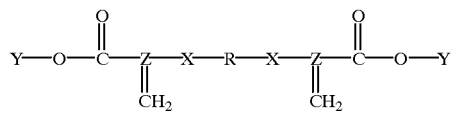

wherein

R=linear or branched alkyl, alkenyl, fluoroalkyl, chloroalkyl, aryl, alkylaryl, cycloalkyl, polysiloxyl, silicones, or combinations thereof,

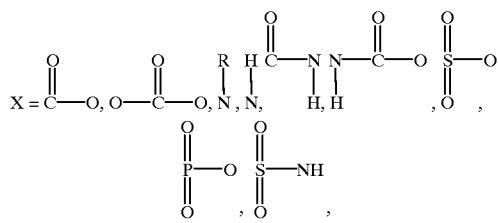

—O—, —S—, or —N$^+$(R$^s$)$_2$—;

Z=—C—, —CH$_2$—C—, —C—[C(R')$_2$]$_n$—, or —CH$_2$—C—[C(R')$_2$]$_n$—;

and

Y=H, a metal ion, ammonium or alkylammonium ion, quaternary ammonium ion or phosphonium ion.

Thus, the mesogens of this embodiment are characterized by a central non-polar core represented by R surrounded by two terminal polar groups. The functionalities R, X, Z, Y, R$^s$, and R$^r$ are indicative of the same chemistries previously defined for these groups. The value attributed to "n" is also as previously defined. Likewise, the discussion previously addressing the purposes, limitations, and other characteristics of these functionalities are again relevant. For example, the use of a linking group X may or may not be needed depending on the desired application and the other functionalities present.

However, the multiple occurrences of individual functionalities X, Y, and Z does not and should not be taken to represent that the same moiety or structure is utilized for both occurrences. Indeed, the individual occurrences of the various functionalities may be the same or different. Thus, following the previous example for the linking group X, in the first occurrence the linking group X may be [—O—] while in the second occurrence the linking group may be [—S—] or even non-existent. Likewise, the first occurrence of Z might represent a two carbon species while the second occurrence of Z might represent a three or one carbon species. This, as previously indicated, is likewise true for multiple occurrences of R$^s$ and R$^r$.

Once a desired mesogen (monomer) structure is specified, a person of ordinary skill in the art having the aid of this disclosure can use known methods to substitute the hydrophobic tail appropriate for the desired mesogen onto the carboxylic acid or carboxylic acid derivative via the vinyl carbon proximal to the carbonyl of the carboxylic acid moiety.

Unique in the materials of the various embodiments is the close coupling of functional groups connected to the indicated polymerizable vinyl bond. Because the described class of mesogens can be polymerized, or alternatively not polymerized, they can be used for a wide range of medical, commercial, and industrial applications. These include but are not limited to surface modification of ceramics, wood, plastics, and metals through monolayer formation, multilayer deposition or polymerization; generation of materials possessing various mesomorphic structures including lamellar liquid crystals; controlled drug delivery devices with organic-soluble drugs encapsulated in a surface active polymeric mesophase; polymeric lubricating surfaces for recording media (hard and floppy disks for computers, magnetic tapes, CD ROM disks) and fibers; ordered smectic layers having application in microelectronic insulating layers and encapsulants possessing low dielectric surfaces; and biorepair materials in which the mesophase is used as a shock absorbing interphase in bioadhesives. The use of these novel mesophases in lubrication applications is due to the fact that the mesophases, particularly those exhibiting smectic arrangements, are characterized by slippage in a plane parallel to the applied shear in combination with a resistance to compression in the direction normal to this plane. This combination of properties provides for easy gliding at extremely fine tolerances.

Polymerization results in a significant increase in stability as the ordered arrangement and the anisotropic properties are maintained, or more appropriately frozen into place. When polymerization is desired, it can be initiated by known means including oxidation/reduction and photochemical processes. For redox initiated polymerizations, catalysis can be synthetic or even biological as demanded by the application. Suitable redox system initiators include peroxides, and persulfates with bisulfite. Photoinitiation of polymerization may be by ambient light or other source. A suitable photoinitiator is, for example, Irgacure 651 which is available from the Ciba-Geigy Corporation. The degree of polymerization may be controlled as known in the art. A lesser degree of polymerization may be desirable. The entrapment of non-polymerized mesogens in areas adjacent to polymerized regions may be desirable in order to achieve certain physical characteristics such as increased flexibility or to stabilize the thermodynamic ordering of the phase. Likewise, other materials may be incorporated into the polymerized mesophase matrix to affect properties. Such materials would include but are not limited to plasticizers, preservatives, antioxidants, and light stabilizers. In certain applications, but by no means all, it will be desirable to initiate polymerization in vivo. In those instances, it will be understood by those of ordinary skill in the art that the concentration of catalyst or other initiator and in some cases the degree of polymerization will be governed by ancillary concerns such as kinetics and toxicity.

In some instances, it will be advantageous for the polymerized organized structures to be crosslinked. While some degree of crosslinking can be expected in these polymeric materials due to, among other reasons, abstraction of alpha hydrogens, crosslinking might likewise be initiated—and possibly the degree of crosslinking controlled—at points of unsaturation in the linking group X, the hydrophobic tail R, or both.

The mesogens—monomers—can be polymerized in a homogeneous system in which only a single polymerizable monomer is present, or alternatively, a copolymerization can be achieved in which more than one polymerizable monomer is present. In a copolymerized system, the additional monomer or monomers which may be referred to as comonomers can be at one extreme a slight modification of the primary monomer or at the other extreme bear no relation to the primary monomer. Indeed, a comonomer may not exhibit any mesomorphic properties. A non-mesomorphic comonomer might for example be used as a flexible spacer. Use of a flexible spacer might for example be desirable for mesogenic monomers exhibiting branching in the hydrophobic tail. Without the spacer, polymerization might prove to be extremely difficult due to the stearic hindrance of the hydrophobic R groups. Ethylene might be used in this regard. Use of a flexible spacer in this manner and for this purpose suggests a block copolymerization. However, random copolymerization utilizing any comonomer or a number of comonomers might likewise be employed. Likewise, block polymerization utilizing three or more monomers can be conducted.

The present invention can be further understood from the following example.

EXAMPLE

Polymerization of 2-{(2,2,3,3,4,4,5,5,6,6,7,7,8,8)-pentadecafluorooctyl-oxy-methyl}-2-propenoic acid The polymerization of 2-{(2,2,3,3,4,4,5,5,6,6,7,7,8,8)-pentadecafluorooctyl-oxy-methyl}-2-propenoic acid was performed in the lyotropic lamellar phase as determined from polarizing microscopy in an aqueous environment. In a typical polymerization, a 28 weight percent (ca. 0.6M) solution of 2-{(2,2,3,3,4,4,5,5,6,6,7,7,8,8)-pentadecafluorooctyl-oxy-methyl}-2-propenoic acid in deionized water was neutralized to approximately 50% through the addition of a calculated amount of sodium hydroxide. After thorough mixing had been achieved, 2 weight percent of potassium persulfate (ca. 0.07M) as the redox initiator was added to the vial and again the sample was thoroughly mixed. The polymerization process was initiated and conducted by placing the vial containing the sample in an oil bath at 80° C. for 4 hours. The polymerized material was liquid crystalline as determined by polarizing microscopy.

What is claimed is:

1. A mesogen of the structure

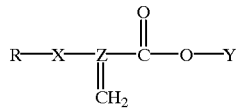

wherein

R comprises linear or branched alkyl, alkenyl, fluoroalkyl, chloroalkyl, aryl, alkylaryl, cycloalkyl, polysiloxyl, silicone, or combinations thereof having at least six carbon atoms;

X comprises

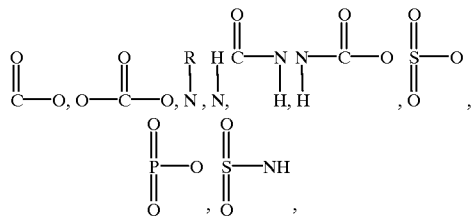

—O—, —S—, or —N$^+$(R$^S$)$_2$—;

Z comprises —C—, —CH$_2$—C—, —C—(C(R$^t$)$_2$)$_n$—, or —CH$_2$—C—(C(R$^t$)$_2$)$_2$; and Y comprises H, a metal ion, ammonium or alkylammonium ion, quaternary ammonium ion, or phosphonium ion, wherein each R$^S$ independently comprises hydrogen; linear or branched alkyl, alkenyl, fluoroalkyl, chloroalkyl, aryl, alkylaryl, cycloalkyl, or polysiloxyl groups; or combinations thereof, wherein each R$^t$ independently comprises hydrogen or an alkyl, and wherein n is a number ranging from two to five.

2. The mesogen of claim 1 wherein the mesogen is derived from methacrylic acid.

3. The mesogen of claim 1 wherein the mesogen is derived from acrylic acid.

4. A mesophase comprised of ordered arrangements of mesogens of the structure:

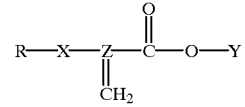

wherein

R comprises linear or branched alkyl, alkenyl, fluoroalkyl, chloroalkyl, aryl, alkylaryl, cycloalkyl, silicone, polysiloxyl, or combinations thereof having at least six carbon atoms;

X comprises

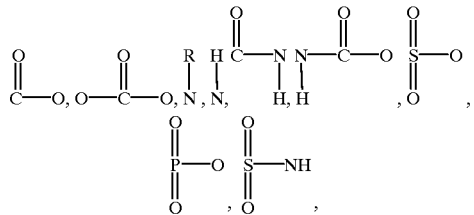

—O—, —S—, or —N$^+$(R$^S$)$_2$—;

Z comprises —C—, —CH$_2$—C—, —C—(C(R$^t$)$_2$)$_n$—, or —CH$_2$—C—(C(R$^t$)$_2$)$_n$—; and Y comprises H, a metal ion, ammonium or alkylammonium ion, quaternary ammonium ion, or phosphonium ion, wherein each R$^S$ independently comprises hydrogen; linear or branched alkyl, alkenyl, fluoroalkyl, chloroalkyl, aryl, alkylaryl, cycloalkyl, or polysiloxyl groups; or combinations thereof, wherein each R$^t$ independently comprises hydrogen or an alkyl, and wherein n is a number ranging from two to five.

5. The mesophase of claim 4 wherein the mesophase is formed from mesogens selected from the group consisting of derivatives of acrylic acid, derivatives of methacrylic acid, and combinations of derivatives of acrylic acid and methacrylic acid.

6. The mesophase of claim 4 wherein the mesogens comprising the mesophase are not all identical.

7. A composition comprised of polymerized monomers of the structure:

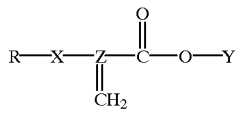

wherein

R comprises linear or branched alkyl, alkenyl, fluoroalkyl, chloroalkyl, aryl, alkylaryl, cycloalkyl, polysiloxyl, silicone, or combinations thereof having at least six carbon atoms;

X comprises

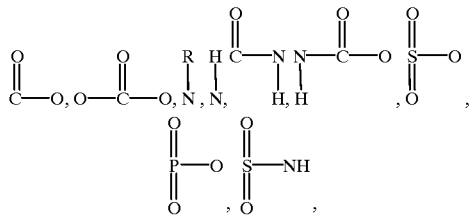

—O—, —S—, or —N$^+$(R$^s$)$_2$—;

Z comprises —C—, —CH$_2$—C—, —C—(C(R$^r$)$_2$)$_n$—, or —CH$_2$—(C(R$^r$)$_2$)$_n$—; and Y comprises H, a metal ion, ammonium or alkylammonium ion, quaternary ammonium ion, or phosphonium ion, wherein each R$^s$ independently comprises hydrogen; linear or branched alkyl, alkenyl, fluoroalkyl, chloroalkyl, aryl, alkylaryl, cycloalkyl, or polysiloxyl groups; or combinations thereof, wherein each R$^r$ independently comprises hydrogen or an alkyl, and wherein n is a number ranging from two to five.

8. The composition of claim 7 wherein the monomers comprising the composition are selected from the group consisting of derivatives of acrylic acid, derivatives of methacrylic acid, and combinations of derivatives of acrylic acid and methacrylic acid.

9. The composition of claim 7 wherein the monomers comprising the composition are not all identical.

10. The composition of claim 7 further comprising at least one polymerized comonomer not of the structure

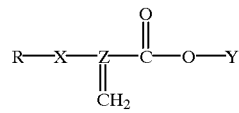

wherein

R comprises branched alkyl, alkenyl, fluoroalkyl, chloroalkyl, aryl, alkylaryl, polysiloxyl, silicone, or combinations thereof;

X comprises

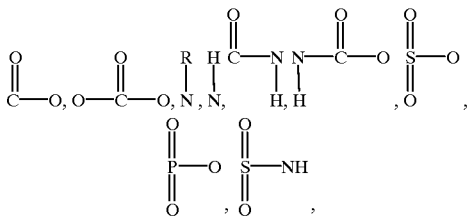

—O—, —S—, or —N$^+$(R$^s$)$_2$—;

Z comprises —C—, —CH$_2$—C—, —C—[C(R$^r$)$_2$]$_n$—, or —CH$_2$—C—[C(R$^r$)$_2$]$_n$—;

and

Y comprises H, a metal ion, ammonium or alkylammonium ion, quaternary ammonium ion or phosphonium ion, wherein each R$^s$ independently comprises hydrogen; linear or branched alkyl, alkenyl, fluoroalkyl, chloroalkyl, aryl, alkylaryl, cycloalkyl, or polysiloxyl groups; or combinations thereof, wherein each R$^r$ independently comprises hydrogen or alkyl, and wherein n is a number ranging from two to five.

11. The composition of claim 10 wherein the at least one polymerized comonomer is ethylene.

12. The composition of claim 10 wherein the at least one polymerized comonomer is propylene.

13. The composition of claim 10 wherein the monomers and the at least one comonomer comprising the composition are in a random arrangement.

14. The composition of claim 10 wherein the monomers and the at least one comonomer comprising the composition are in a block arrangement.

15. The composition of claim 7 wherein the polymerization of the monomers is initiated photochemically.

16. The composition of claim 7 wherein the polymerization of the monomers is initiated by a redox reaction.

* * * * *